Nov. 13, 1923.
F. E. NUGENT
1,474,160
TIRE VALVE
Filed Dec. 22, 1920       2 Sheets-Sheet 1
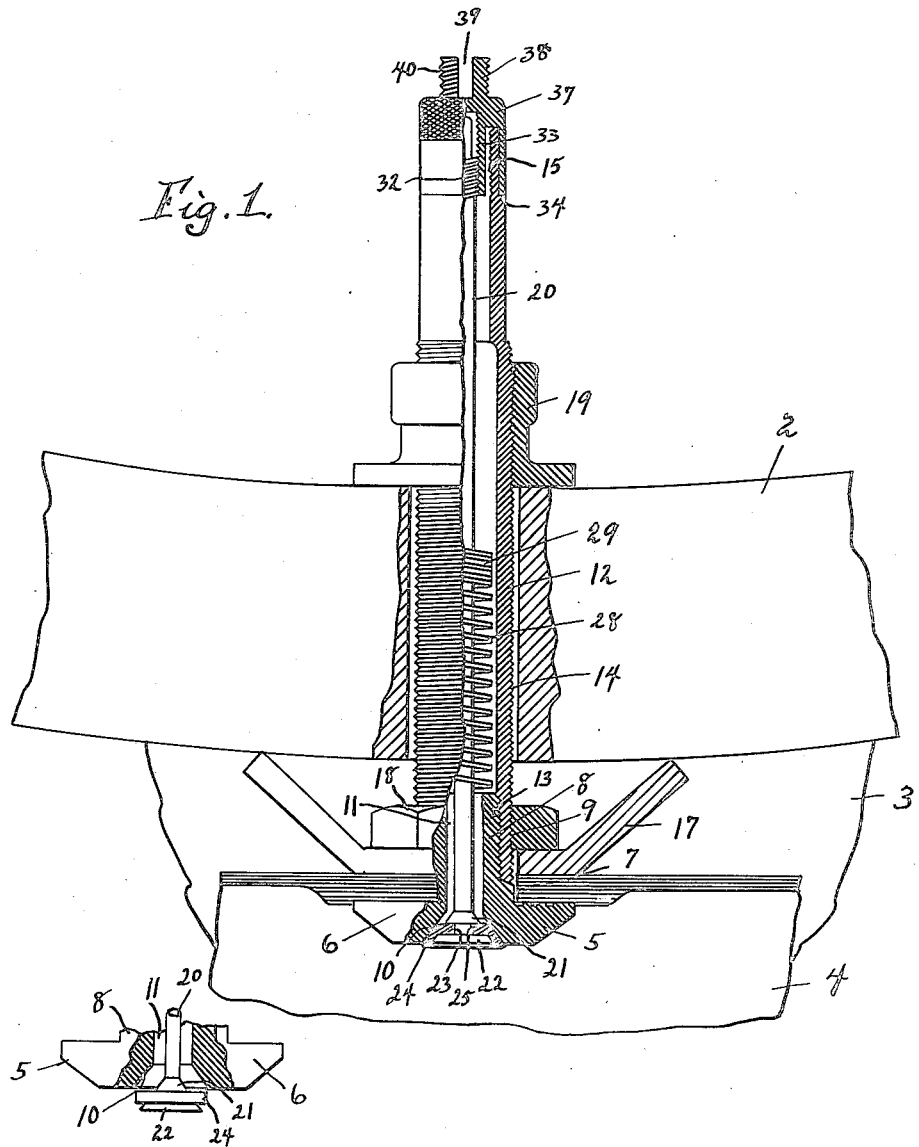
INVENTOR
Francis E. Nugent,
By W. W. Williamson, Atty

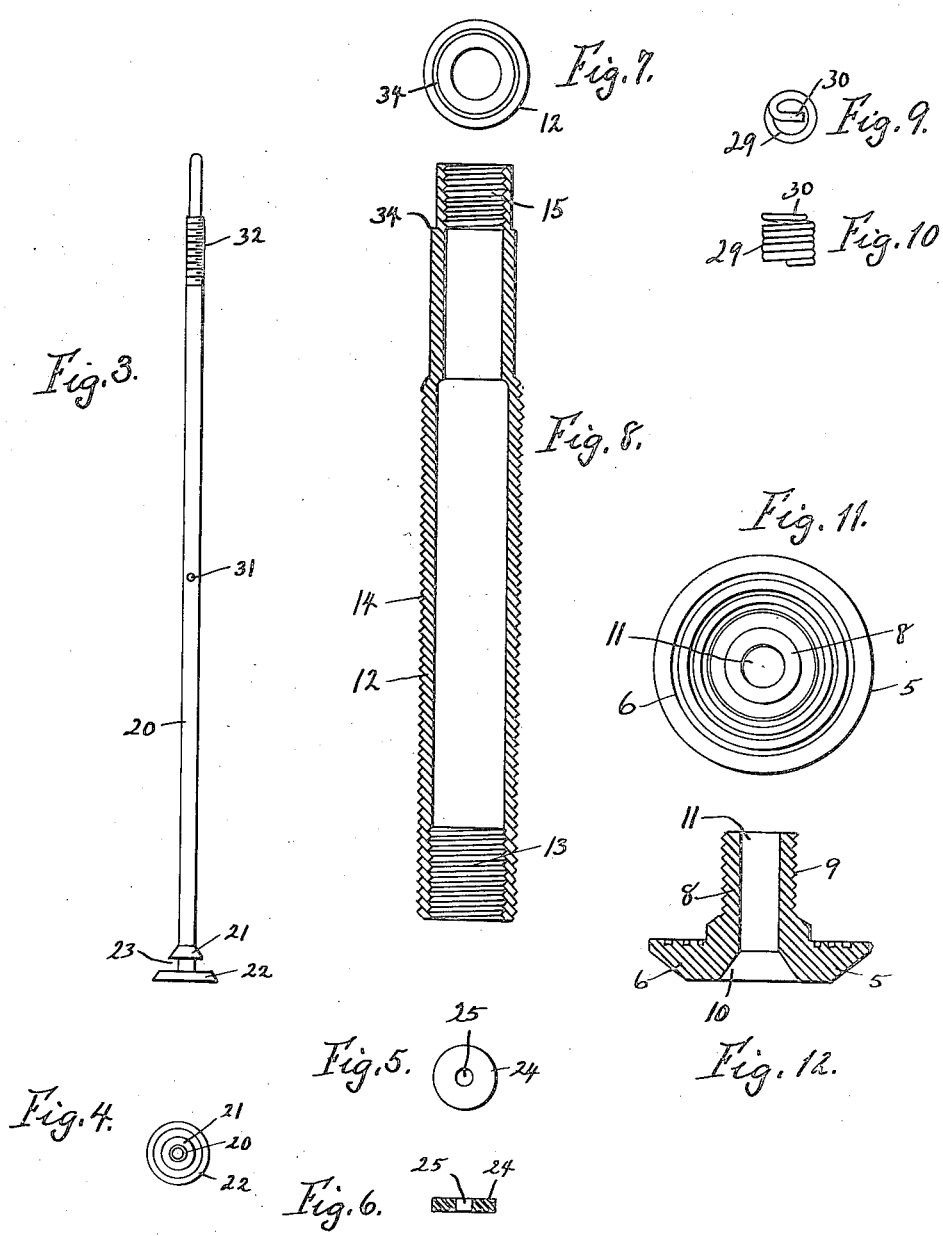

Patented Nov. 13, 1923.

1,474,160

UNITED STATES PATENT OFFICE.

FRANCIS E. NUGENT, OF PHILADELPHIA, PENNSYLVANIA.

TIRE VALVE.

Application filed December 22, 1920. Serial No. 432,380.

*To all whom it may concern:*

Be it known that I, FRANCIS E. NUGENT, a citizen of the United States, residing at Philadelphia, in the county of Philadelphia and State of Pennsylvania, have invented new and useful Improvements in Tire Valves, of which the following is a specification.

My invention relates to new and useful improvements in a tire valve, and has for its object to provide a valve seat member having a conical valve seat recess therein and a conical valve carrying a flat compressible washer or gasket adapted to be forced into the conical recess by the conical valve and compressed so that a portion of said washer will be forced beyond the valve and provide an uncompressed rim extending over the edge of the valve and a portion of one face of the valve seat member.

Another object of the invention is to provide a tire valve of novel construction, the valve member which will be so held upon its seat by combined spring and air pressure as to preclude the possibility of leakage regardless of the degree of pressure upon the air.

A still further object of the invention is to provide a novel means carried by the valve stem to act as an abutment for one end of the spring and to provide a valve disc and its component parts which may be readily applied to the valve stem which may be relatively inexpensively manufactured.

Where valve seats having one or more raised circular edges against which flat faced compressible discs are forced, such discs shortly become cut and lacerated, causing them to leak and obstruct the operations; also where a flat compressible disc is drawn against a curved seat by a flat valve only a comparatively small contact is effected, which under the conditions met in present day tire practice is subject to leakage and other defects.

All of these disadvantages are overcome by my present construction of valve and seat therefor, in that the flat compressible disc is drawn into a cone shaped seat by a correspondingly shaped valve which latter, not only causes the disc to conform to the seat throughout a relatively large area but also causes the outer edge of said disc to be forced over the edge of the valve or said valve and its seat. When such a valve is closed upon its seat by spring pressure the compressed air within the tire will tend to force the exposed surfaces of the disc tightly against the inner surfaces of the valve and valve seat, thus increasing the security of the valve against leakage from any increase of the air pressure.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side elevation of my improved tire valve, portions thereof being broken away and shown in section and illustrated in connection with a portion of a wheel having a tire thereon which is also partially shown in section.

Fig. 2, is a fragmentary sectional view of the valve seat member showing the valve and valve disc in an open position relative thereto.

Fig. 3, is a side elevation of the valve stem.

Fig. 4, is an end view thereof.

Fig. 5, is a face view of the valve disc.

Fig. 6, is a sectional view thereof.

Fig. 7, is an upper or outer end view of the casing or barrel.

Fig. 8, is a longitudinal section thereof.

Fig. 9, is an end view of the stop or abutment for the valve spring.

Fig. 10, is a side elevation thereof.

Fig. 11, is a face view of the valve seat member.

Fig. 12, is a sectional view thereof.

In carrying out my invention as here embodied, 2 represents a wheel and more particularly the felly thereof which carries an outer tire 3 within which is located an inner tube 4. In the inner tube 4 is placed the valve seat member 5, the disc portion 6 thereof lying within the inner tube and its corrugated face engaging the material about the hole 7 through said inner tube, the stem or shank 8 of said valve seat member projecting through said hole and this shank or stem is externally threaded as at 9. In one face of the valve seat member is formed the flared or conical valve seat recess 10 with which communicates the opening 11 passing longitudinally through the shank or stem 8.

On the shank or stem 8 is screwed one end of the barrel or casing 12, said end having internal threads 13 for coaction with the external threads of the stem or shank 8 on the valve seat member, the inner end of said barrel or casing being jambed down on the valve seat member without intervening objects. The barrel or casing is threaded externally throughout the major portion of its length as at 14, said threads being on the inner portion or inner end thereof and the outer end of this casing or barrel is internally threaded as at 15 for a purpose to be more fully explained.

When the valve seat member 5 and the barrel or casing 12 have been positioned relative to the inner tube, the bridge 17 is placed over the barrel and brought into engagement with the outer face of the inner tube after which the nut 18 is screwed on to the barrel until it contacts with the bridge 17 which will force the same toward the disc portion of the valve seat member, and thus clamp the inner tube therebetween, said bridge having diverging arms which engage the wheel, as for instance the felly thereof, which will assist in positioning the valve parts relative to the wheel. This construction eliminates the necessity of using liners, shims or fillers and permits the valve to be applied to the inner tube without dismantling the same, it being only necessary to back off the nut 18 the desired distance to permit the bridge to be moved far enough away from the valve seat member so that said valve seat member may be inserted in the tire.

When placing the tire upon the wheel the barrel is inserted through an opening in the felly of said wheel and the collar 19 then threaded upon the barrel 14 until it engages the wheel felly and draws the arms of the bridge against the opposite face thereof when the parts will be firmly held in their proper positions. It is particularly noted that the nut 18 and the collar 19 are both mounted upon the barrel by means of the same threads 14.

20 represents a valve stem which has formed thereon a flared or conical head 21 and a valve member 22 spaced from said head in such manner as to leave a recess 23 for the reception and retention of the compressible disc 24. The periphery of the valve member is also flared or cone shaped the angle of said flare coinciding with the angle of flare of the head 21.

The compressible disc 24 is provided with a central hole 25 which in assembling is passed over the stem 20 and brought into contact with the head 21, after which said disc is sprung or stretches over said head so as to contact within the space or recess 23. This operation will be facilitated by the cone shape of the head 21 as will be readily understood.

When the device is assembled and the valve drawn into the seat recess 10 the disc will be deflected to conform with the conical shape of said recess and the periphery of the valve, and as increased pressure is exerted upon said valve it will continue to compress the confined portion of said disc and if this pressure is increased sufficiently the outer edges of the disc will be forced beyond the edges of the valve and seat, thus forming an additional seal. This additional seal being exposed to the action of the air under pressure will be forced over and against the edges of the valve and seat, thereby further increasing the safety against leakage, thus no matter how great the air pressure, leakage will be prevented. This construction will also permit the valve to seal even though the valve seat may be partially fouled by dirt or grit.

The valve stem passes through the shank 8 of the valve seat member and through the barrel or casing 12 in such manner as to engage the valve seat recess 10 and when these parts are in contact the outer end of the valve stem lies adjacent the outer end of the barrel as shown in Fig. 1 and in order to normally hold said parts in these positions I provide a spring 28 coiled about the valve stem with one end in engagement with the shank 5 and the other end in engagement with the spring abutment 29 which is formed of a piece of wire coiled about the valve stem 20 and having one end 30 disposed transversely across the coils thereof and registering with the hole 31 in the valve stem which positions said abutment and prevents its accidental displacement. By forming the spring abutment in this manner an abutting surface is provided resembling coils of the spring, thereby giving a large bearing surface to said spring which will prevent the possibility of said spring from becoming displaced or the end thereof bent out of shape which would cause cramping.

The upper end of the valve stem 20 is externally threaded as at 32 to receive the internally threaded projection 33 formed with the cap 37, the latter slipping over the outer end of the barrel and engaging a circumferential shoulder 34 on said barrel so that by revolving said cap the valve stem will be drawn outward to firmly force the valve disc against its seat and so hold it to prevent accidental opening of the valve.

With the cap is formed a bleeder lug 38 having a longitudinal slot 39 therethrough and provided with external threads 40 to coact with the internal threads 15 of the barrel or casing 12. To bleed the air from the tire the cap is removed and inverted so the barrel. By exerting sufficient pressure upon the cap the valve will be removed from its seat, through the medium of the valve stem, and when forced far enough away the bleeder lug will engage the threads 15 and may then be screwed in the barrel to temporarily hold the valve open. When the parts are in the positions above described the air will readily pass to the atmosphere through the slot 39, it being understood that a portion thereof is above the outer end of the barrel or casing.

By constructing a tire valve in this manner when the same is placed upon a tire the valve seat will always be in the same position relative to the outer end of the barrel regardless of the thickness of the tube and therefore the outer end of the valve stem will be always in the same position relative to the outer end of the barrel and at no time will project beyond said barrel such a distance that it would be impracticable to use the head 33 or to enclose the parts by the cap 16. The disadvantages are thus overcome which happen where the parts have to be dismantled for assembly and where liners, shims or fillers are used to make up the varying thicknesses of the tires and the varying thicknesses of wheel fellies.

Of course I do not wish to be limited to the exact details of construction as herein shown as these may be varied within the limits of the appended claims without departing from the spirit of my invention.

Having thus fully described my invention, what I claim as new and useful is:—

1. In a device of the character stated, a valve stem having a hole therethrough and a spring abutment consisting of a wire coiled about said stem with one end passing through said hole.

2. In a device of the character described, a valve seat having a cone shaped recess, a cone shaped valve, a flat compressible disc carried by said valve in such manner that when the valve is forced toward its seat said disc will be caused to conform to the contour of the recess and valve, the outer edge of said disc overlapping the edges of the valve and seat, and means for forcing the valve toward its seat.

3. In a device of the character stated, a valve seat member having a conical valve seat recess, a valve stem passing through said member, a conical valve on said stem and a flat washer on the stem between the valve seat recess and valve, which will be bent to cone shape and compressed and forced beyond the edges of the recess and valve when the latter is moved toward the former.

4. In a device of the character described, a valve seat member having a conical valve seat recess, a conical valve for coaction therewith and a flat compressible washer carried by the valve adapted to be compressed into the recess by said valve.

5. In a device of the character mentioned, a valve seat member having a conical valve seat recess, a conical valve and a flat washer between the conical recess and conical valve adapted to be compressed by the latter into the former with an uncompressed portion projecting beyond the valve and extending over the edge thereof and a portion of one face of the valve seat member.

In testimony whereof, I have hereunto affixed my signature.

FRANCIS E. NUGENT.